United States Patent
Kim et al.

(10) Patent No.: US 12,010,650 B2
(45) Date of Patent: Jun. 11, 2024

(54) FBS REDIRECTION ATTACK METHOD USING UNICAST MESSAGE INJECTION IN LTE AND THE SYSTEM THEREOF

(71) Applicant: Korea Advanced Institute of Science and Technology, Daejeon (KR)

(72) Inventors: Yongdae Kim, Daejeon (KR); CheolJun Park, Daejeon (KR); Hojoon Yang, Daejeon (KR); Sangwook Bae, Daejeon (KR); Mincheol Son, Daejeon (KR); Jiho Lee, Daejeon (KR); Hongil Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 417 days.

(21) Appl. No.: 17/451,123

(22) Filed: Oct. 15, 2021

(65) Prior Publication Data

US 2022/0124673 A1    Apr. 21, 2022

(30) Foreign Application Priority Data

Oct. 16, 2020 (KR) .................. 10-2020-0133927
Dec. 7, 2020 (KR) .................. 10-2020-0169702

(51) Int. Cl.
*H04W 68/02* (2009.01)
*H04W 56/00* (2009.01)

(52) U.S. Cl.
CPC ......... *H04W 68/02* (2013.01); *H04W 56/001* (2013.01)

(58) Field of Classification Search
CPC ............................. H04W 68/02; H04W 56/001
USPC ................................................ 455/458
See application file for complete search history.

(56) References Cited

U.S. PATENT DOCUMENTS

2020/0178065 A1*  6/2020  Huber ................. H04L 63/1425

OTHER PUBLICATIONS

Yang, H. et al., "Hiding in Plain Signal: Physical Signal Overshadowing Attack on LTE," Proceedings of the 28th USENIX Security Symposium, Santa Clara, USA, Aug. 14-16, 2019, pp. 55-72.
Park, C.J. et al., "Coercive FBS Redirection Attack using Unicast Message Injection in LTE," Conference on Information Security and Cryptography—Summer 2020, Jul. 15, 2020.

* cited by examiner

*Primary Examiner* — Joel Ajayi
(74) *Attorney, Agent, or Firm* — NIXON PEABODY LLP

(57) ABSTRACT

A fake base station (FBS) redirection attack method using unicast message injection in a long term evolution (LTE) wireless section and a system thereof are provided. The FBS redirection attack method includes synchronizing with a signal of a commercial base station connected with a target device being an attack target, transmitting an international mobile subscriber identity (IMSI) paging message to the target device using an IMSI of the target deice, and injecting a unicast message including a frequency of an FBS into the target device, before a base station re-access process is completed in the target device which decodes the IMSI paging message.

6 Claims, 8 Drawing Sheets

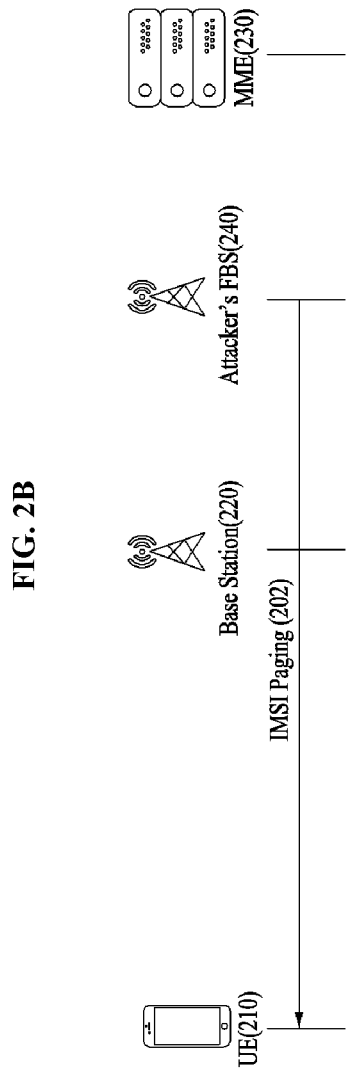

FIG. 3

| No. | Time | Earfcn | Protocol | Length | Info |
|---|---|---|---|---|---|
| 23 | 0.2032... | 100 | LTE RRC UL_CCCH | 76 | RRCConnectionRequest |
| 25 | 0.2032... | 100 | LTE RRC DL_SCH | 81 | SystemInformation [SIB3] |
| 27 | 0.2033... | 100 | LTE RRC UL_SCH | 81 | SystemInformation [SIB5] |
| 31 | 0.2035... | 100 | LTE RRC DL_CCCH | 100 | RRCConnectionSetup |
| 33 | 0.2035... | 100 | LTE RRC UL_DCCH/... | 165 | RRCConnectionSetupComplete, Attach request, |
| 35 | 0.4260... | 100 | LTE RRC DL_DCCH/... | 82 | DLInformationTransfer, Identity request |
| 45 | 0.4262... | 100 | LTE RRC UL_DCCH/... | 91 | ULInformationTransfer, Identity response |
| 470 | 0.4263... | 100 | LTE RRC DL_DCCH/... | 82 | DLInformationTransfer, ESM information req |
| 5141 | 174.60... | 100 | LTE RRC PCCH | 88 | Paging (2. PagingRecords) |
| 5173 | 179.72... | 100 | LTE RRC PCCH | 77 | Paging (1. PagingRecords) |
| 5181 | 180.05... | 100 | LTE RRC DL_DCCH | 76 | RRCConnectionRelease [cause=other] |
| 5183 | 180.05... | 2600 | LTE RRC BCCH_BCH | 73 | MasterInformationBlock (SFN=81) |
| 5185 | 180.27... | 2600 | LTE RRC BCCH_BCH | 73 | MasterInformationBlock (SFN=82) |
| 5187 | 180.27... | 2600 | LTE RRC BCCH_BCH | 73 | MasterInformationBlockType1 |
| 5189 | 180.27... | 2600 | LTE RRC DL_SCH | 88 | SystemInformation [SIB2] |
| 5191 | 180.27... | 2600 | LTE RRC DL_SCH | 111 | SystemInformation [SIB2] |
| 5195 | 180.51... | 2600 | LTE RRC DL_SCH | 81 | SystemInformation [SIB3] |
| 5205 | 180.51... | 2600 | LTE RRC UL_CCCH | 76 | RRCConnectionRequest |
| 5209 | 180.78... | 2600 | LTE RRC DL_CCCH | 100 | RRCConnectionSetup |
| 5211 | 180.78... | 2600 | LTE RRC DL_DCCH/... | 77 | RRCConnectionSetupComplete, Service request |

```
> rrcConnectionRelease-r8
  releaseCause: other (1)
  > redirectedCarrierInfo: eutra (0)    ——311
      eutra: 2600
  > idleModeMobilityControlInfo          ——312
    > freqPriorityListEUTRA: 2 items
      > Item 0
        > FreqPriorityEUTRA
          carrierFreq: 2600
          cellReselectionPriority: 7
      > Item 1
        > FreqPriorityEUTRA
          carrierFreq: 100
          cellReselectionPriority: 1
```

FIG. 4

| No. | Time | Earfcn | Protocol | Lenght | Info |
|---|---|---|---|---|---|
| 4969 | 191.682822467 | | 100 LTE RR... | 88 | Paging (2 PagingRecords) |
| 4989 | 194.242681954 | | 100 LTE RR... | 77 | Paging (1 PagingRecords) |
| 5011 | 196.789193125 | | 100 LTE RR... | 88 | Paging (2 PagingRecords) |
| 5147 | 199.362780434 | | 100 LTE RR... | 88 | Paging (3 PagingRecords) |
| 5263 | 201.909068054 | | 100 LTE RR... | 77 | Paging (1 PagingRecords) |
| 5383 | 205.761962353 | | 100 LTE RR... | 84 | RRCConnectionRelease [cause-other] |
| 5385 | 205.762090630 | | 363 LTE RR... | 73 | MasterInformationBlock (SFN-5) |
| 5387 | 205.762161324 | | 363 LTE RR... | 73 | MasterInformationBlock (SFN-5) |
| 5389 | 205.762245749 | 410 | 363 LTE RR... | 73 | MasterInformationBlock (SFN-5) |
| 5391 | 205.762316470 | | 363 LTE RR... | 88 | SystemInformaionBlockType1 |
| 5393 | 206.009987408 | | 363 LTE RR... | 98 | SystemInformation [SIB2] |
| 5407 | 206.973268647 | | 363 LTE RR... | 76 | RRCConnectionRequest |
| 5411 | 206.973536986 | | 363 LTE RR... | 91 | RRCConnectionSetup |
| 5413 | 206.973600317 | | 363 LTE RR... | 77 | RRCConnectionSetupComplete, Service re |

FBS REDIRECTION ATTACK METHOD USING UNICAST MESSAGE INJECTION IN LTE AND THE SYSTEM THEREOF

CROSS-REFERENCE TO RELATED APPLICATIONS

A claim for priority under 35 U.S.C. § 119 is made to Korean Patent Application No. 10-2020-0169702 filed on Dec. 7, 2020, in the Korean Intellectual Property Office, and to Korean Patent Application No. 10-2020-0133927 filed on Oct. 16, 2020 in the Korean Intellectual Property Office, the entire contents of which are hereby incorporated by reference.

BACKGROUND

Embodiments of the inventive concept described herein relate to a fake base station (FBS) redirection attack method using unicast message injection in a long term evolution (LTE) wireless section and a system thereof, and more particularly, relate to an attack for injecting an LTE control plane message into a target device connected with a commercial base station to force the target device to connect with an FBS.

An attack on a mobile communication terminal mainly starts by guiding victim user equipment (UE) to a base station of an attacker using a fake base station (FBS).

The FBS is the most widely used attack tool in attacks performed in all mobile communication systems from 2 generation (G) to LTE. An attacker guides a victim UE to connect with the established base station and transmits a malicious control plane signal to the victim UE to obtain a unique identifier of the UE or performs various attacks, such as location tracking, eavesdropping, and denial of service attacks, which violate users' privacy and use of the service.

However, to connect the victim UE with the FBS, the attacker should generate a signal of intensity greater than a signal transmitted by a commercial mobile communication base station by 40 dB, may not attack a UE which is previously connected with the base station to communicate with the base station, should waits until the UE is connected with the base station again, and may not specify the victim UE to attack the victim UE.

In detail, to explain the process of being connected with the FBS, the attacker sets information such as an operating frequency of the FBS and a physical cell identity (PCI) to be similar to an operation environment of a commercial base station and transmits a broadcast message including the information of the FBS. In general, a UE attempts to access a base station with the highest signal strength, in a base station search and selection process for establishing a wireless connection. Therefore, the attacker needs a signal stronger than the commercial base station by 40 dB or more to guide the victim UE to access his or her FBS. Furthermore, a base station reselection process is influenced by a frequency of a base station, a message of the base station, a message previously received by a UE, a base station previously connected with the UE, or the like as well as a signal intensity.

Thus, because an existing FBS attack uses physical signal characteristics, for example, increases a signal level or changes an ID of the FBS, an attack success rate varies with situations. In addition, because the above-mentioned connection of the FBS is performed in a reselection process after the wireless connection with an existing commercial base station is released, an attack may not be performed on a UE which is previously connected with the base station to communicate with the base station. As such, the connection to the FBS is a first stage in the attack process. However, several difficulties are present to connect the victim UE connected with the normal base station with the FBS.

PRIOR ART DOCUMENTS

Non-Patent Documents

Yang et al., Hiding in Plain Signal: Physical Signal Overshadowing Attack on LTE, USENIX'19

SUMMARY

Embodiments of the inventive concept provide an attack for implementing a unicast message injection technology using vulnerabilities where there is no security function in a physical layer in an LTE protocol and solving existing limitations of attacks using an FBS using the unicast message injection technology to force a victim UE to connect with the FBS.

According to an exemplary embodiment, a fake base station (FBS) redirection attack method using unicast message injection in a long term evolution (LTE) wireless section may include synchronizing with a signal of a commercial base station connected with a target device being an attack target, transmitting an international mobile subscriber identity (IMSI) paging message to the target device using an IMSI of the target device, and injecting a unicast message including a frequency of an FBS into the target device, before a base station re-access process is completed in the target device which decodes the IMSI paging message.

According to an exemplary embodiment, a fake base station (FBS) redirection attack system using unicast message injection in a long term evolution (LTE) wireless section may include a signal processing unit that synchronizes with a signal of a commercial base station connected with a target device being an attack target, a message transmission unit that transmits an international mobile subscriber identity (IMSI) paging message to the target device using an IMSI of the target device, and a connection attack unit that injects a unicast message including a frequency of an FBS into the target device, before a base station re-access process is completed in the target device which decodes the IMSI paging message.

According to an exemplary embodiment, a fake base station (FBS) redirection attack method using unicast message injection in a long term evolution (LTE) wireless section may include synchronizing with a signal of a commercial base station, in a state where a target device being an attack target and the commercial base station are connected with each other, collecting an international mobile subscriber identity (IMSI) and a radio network temporary identifier (RNTI) of the target device, transmitting an IMSI paging message to the target device using the IMSI, and specifying a UE-specific search space of the target device using the RNTI and injecting a unicast message including a frequency of an FBS into the UE-specific search space, before a base station re-access process is completed in the target device which decodes the IMSI paging message.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 2A, 2B, 2C, and 2D illustrate a scenario of a forced FBS redirection attack according to an embodiment of the inventive concept;

FIG. 3 illustrates an example of a unicast message according to an embodiment of the inventive concept;

FIG. 4 illustrates a log result of a target device which is attacked to be connected with an FBS according to an embodiment of the inventive concept.

DETAILED DESCRIPTION

Figure 1:
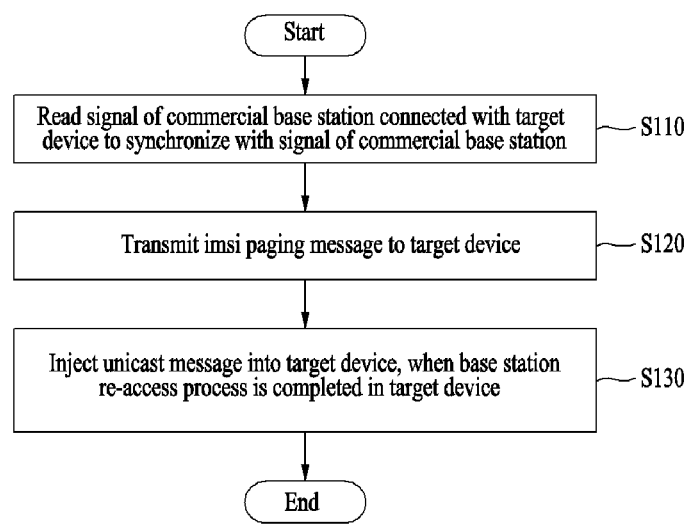
FIG. 1 illustrates an operational flowchart of an FBS redirection attack method according to an embodiment of the inventive concept.

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided so that this disclosure will be through and complete and will fully convey the concept of the invention to those skilled in the art, and the inventive concept will only be defined by the scope of the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of stated components, steps, operations, and/or elements, but do not exclude presence or addition of one or more other components, steps, operations, and/or elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, exemplary embodiments of the inventive concept will be described in detail with reference to the accompanying drawings. The same reference denotations are used for the same components on the drawings, and a duplicated description of the same components will be omitted.

An embodiment of the inventive concept proposes an attack for forcing the victim terminal connected with a commercial base station to connect with an FBS, using vulnerabilities of a physical layer where there is no security function. To this end, an embodiment of the inventive concept implements a unicast message injection technology, which may match time/frequency timing with a commercial network using an open source LTE stack and software defined radio (SDR) to transmit a malicious message, thus forcing a UE connected with a normal base station to connect with an FBS.

In the past, there is a message injection attack for injecting a malicious signal using a characteristic of mobile communication transmitted over the air without requesting to connect with an FBS. Such a message injection attack is an attack using a feature of a physical layer of a mobile communication network. When it is possible to synchronize a signal of the commercial base station connected with the UE with time, frequency, and message transmission timing, an attacker may overlay a malicious message on an existing signal transmitted by a normal base station.

In the past, there is an attack for obtaining time and frequency synchronization from the normal base station to inject a message. In this case, because the existing message used for attack is a broadcast message such as paging or SIB and because these messages are transmitted to all users, it is ease to inject the message because the transmission timing is set. Furthermore, an attack using existing message injection needs signal intensity which is greater than that in the commercial base station by 3 dB. This is signal intensity much less than that of an attack through an FBS. It is shown that a probability that an attack will be detected is lower than the past.

By using it, an embodiment of the inventive concept proposes a technology of expanding an existing message injection attack limited to the broadcast message to a unicast message and forces a victim terminal (hereinafter, referred to as a "target device") to connect with an FBS to solve the limitations which are present in an existing attack process using the FBS.

Hereinafter, an embodiment of the inventive concept will be described in detail with reference to FIGS. 1 to 5.

FIG. 1 illustrates an operational flowchart of an FBS redirection attack method according to an embodiment of the inventive concept.

Figure 5:
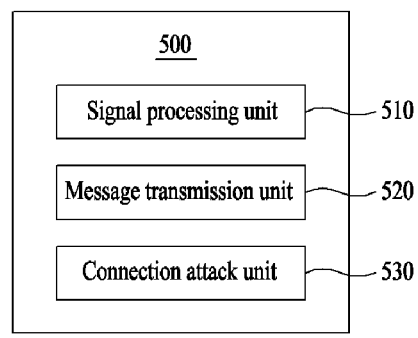
FIG. 5 is a block diagram illustrating a detailed configuration of an FBS redirection attack system according to an embodiment of the inventive concept.

The method of FIG. 1 may be performed by an FBS redirection attack system according to an embodiment of the inventive concept illustrated in FIG. 5.

An attacker who uses an FBS redirection attack according to an embodiment of the inventive concept may exist in the same base station range as a target device which is a victim, may listen to wireless section communication between a commercial base station and the target device, and may transmit a wireless signal. Furthermore, the attacker who uses an FBS redirection attack according to an embodiment of the inventive concept may sniff a downlink message without any authority using a downlink sniffing tool such as Airscope and may transmit a wireless signal using software defined radio (SDR) equipment. In this case, it is assumed that the attacker knows an international mobile subscriber identity (IMSI) and a radio network temporary identifier (RNTI) of the target device.

Referring to FIG. 1, in operation S110, a signal of a commercial base station connected with the target device which is an attack target may be read and synchronized.

In a state where the target device which is the attack target and the commercial base station which is a normal base station are connected with each other and where a normal service is performed after a security activation exchange process, operation S110 may be to synchronize with a time and a frequency of the commercial base station connected with the target device. At this time, the target device may be in a state where a plain text message is not processed.

The target device according to an embodiment of the inventive concept refers to all types of terminal devices, such as a general computer, a smartphone, and a wearable device, which are capable of performing wired or wireless communication and processing certain data.

In operation S120, an international mobile subscriber identity (IMSI) paging message may be transmitted to the target device using an IMSI of the target deice.

The FBS relocation attack method according to an embodiment of the inventive concept may be to transmit the IMSI paging message to the target device using the IMSI of the target device. Receiving the IMSI paging message, the target device may immediately end a connection with an existing commercial base station, may delete all parameters including a security context, and may retry a process of accessing an old or new base station. Thus, the FBS relocation attack method according to an embodiment of the inventive concept may be a method for injecting an IMSI paging message into the target device to delete a security context of a victim UE.

In operation S130, a unicast message including a frequency of an FBS may be injected into the target device, before a base station re-access process is completed in the target device which decodes the IMSI paging message.

Before the target device, which decodes the IMSI paging message, completes the process of re-accessing an old or new base station, in operation S130, the FBS relocation attack method according to an embodiment of the inventive concept may be inject an attack message including the frequency of the FBS into the target device.

In detail, in operation S130, the FBS relocation attack method according to an embodiment of the inventive concept may be to inject a unicast message of a radio resource control (RRC) connection release message into a UE-specific search space of the target device, when the target device completes the base station re-access process. In this case, an embodiment of the inventive concept may specify a UE-specific search space depending on a radio network temporary identifier (RNTI) of the target device and may inject a unicast message in which a downlink control information (DCI) format and a control plane sequence number according to a transmission mode of the network are set.

Thus, the target device, the security context of which is deleted, may process the RRC connection release message of plain text and may request access from the FBS to be connected with the FBS.

In this case, the RRC connection release message may include an IdleModeMobilityControlInfo (IMMCI) field for delivering connection priorities of cells when the target device reselects a cell and a redirectedCarrierInfo field for connecting a user with a specific cell and may include a frequency and an evolved absolute radio frequency channel number (EARFCN) of the FBS in each field.

An embodiment of the inventive concept may include a frequency of an LTE FBS, but may inject a unicast message including a frequency of a 3G or 2G FBS other than the frequency of the LTE FBS. In other words, although the FBS is run as the 3G or 2G base station as well as the 4G base station, the same attack is possible.

FIGS. 2A to 2D illustrate a scenario of a forced FBS redirection attack according to an embodiment of the inventive concept.

Figure 2A:
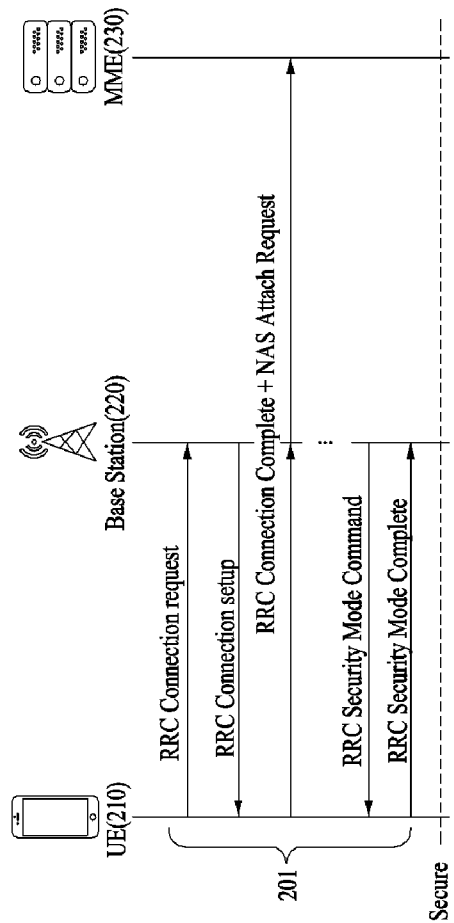

Referring to FIG. 2A, an FBS relocation attack method according to an embodiment of the inventive concept is an attack method corresponding to all general terminal devices. A target device 210 which is an attack target may be in a state where it is connected with a normal base station 220 and may perform a normal service 201 after a security activation exchange process with the normal base station 220. At this time, the target device 210 may be in a state where a plain text message is not processed.

Referring to FIG. 2B, an attacker 240 who uses an FBS redirection attack according to an embodiment of the inventive concept may inject an IMSI paging message into the target device 210 using an IMSI of the target device 210.

Figure 2C:
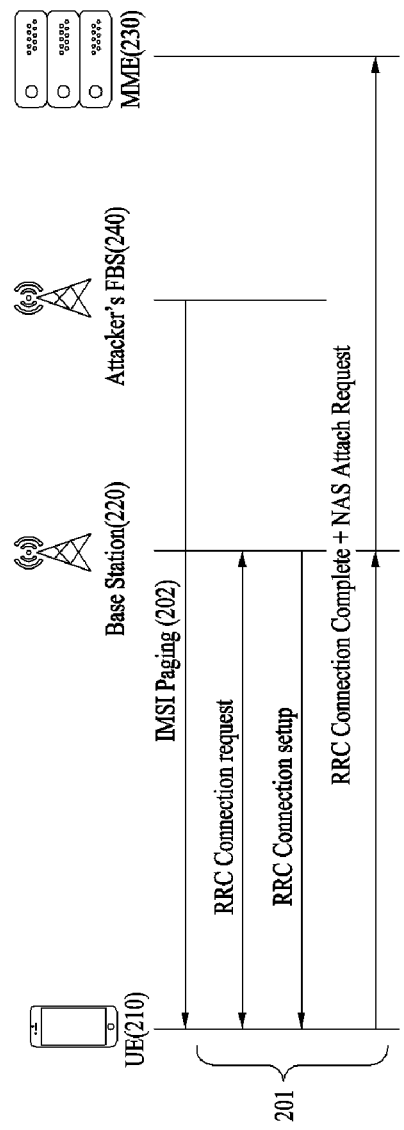

Referring to FIG. 2C, the target device 210 which decodes the IMSI paging message may immediately end the connection with the existing normal base station 220, may delete all parameters, and may retry a process 203 of accessing the normal base station 220. Thus, the attacker 240 may delete a security context using the method for injecting the IMSI paging message into the target device 210.

Figure 2D:
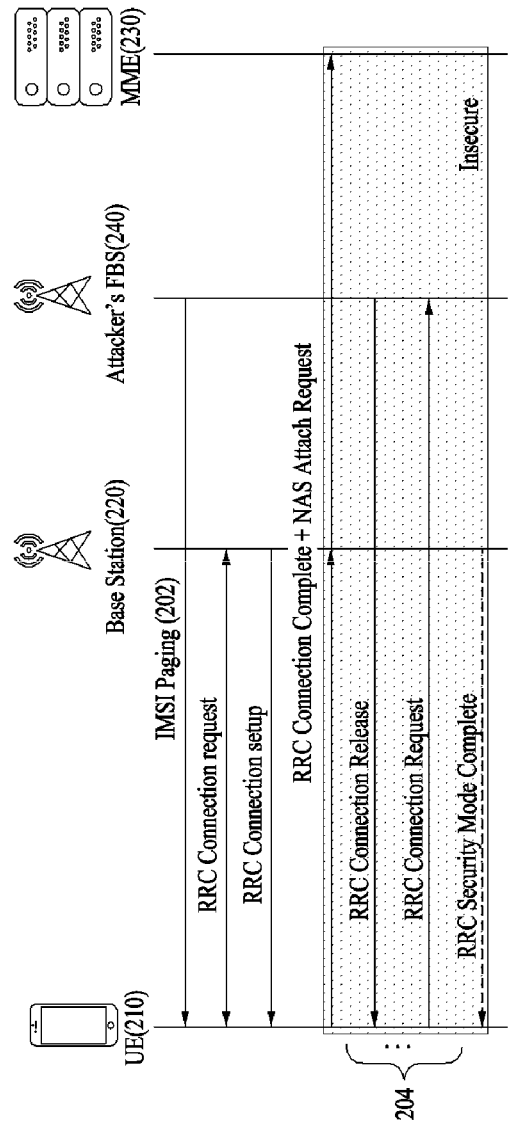

Referring to FIG. 2D, before the target device 210 completes a process of re-accessing the normal base station 220, the attacker 240 may inject a unicast message of a radio resource control (RRC) connection release message into a UE-specific search space of the target device 210. In this case, the target device 210 may process the RRC connection release message of plain text because there is no security context. Due to this, the target device 210 may process the message of the attacker 240 and may request access from an FBS 240 (refer to 204) to be connected with the FBS 240.

FIG. 3 illustrates an example of a unicast message according to an embodiment of the inventive concept.

The unicast message should be injected into a UE-specific search space of a target device for unicast message injection. A position where a message is delivered over a physical downlink control channel (PDCCH) may be divided into a common search space and the UE-specific search space according to a type of the message. A broadcast message all user should read in the range of the base station may be delivered to the common search space. On the other hand, a unicast message which should be delivered to only a specific user may be delivered to the UE-specific search space.

An existing technology injects a message into a fixed common search space, whereas an embodiment of the inventive concept should inject a message into the UE-specific search space, which is selectively decoded by the target device to inject a unicast message. This position may be determined according to a radio network temporary identifier (RNTI) of the target device. Furthermore, an embodiment of the inventive concept should encode a unicast message in which a downlink control information (DCI) format and a control plane sequence number according to a transmission mode of the network are correctly set and should inject the unicast message into the UE-specific search space which is a suitable position.

When succeeding in injecting the unicast message into the target device, the target device which is a victim UE may decode a malicious message. At this time, an operation of a UE may be determined after decoding the malicious message according to contents of the message.

An attack message used for attack may be an RRC connection release message which is one of RRC messages transmitted to the target device by the base station. This may be a unicast downlink message transmitted to a user by the base station, which may be used to end a wireless connection between the user and the base station for wireless resource management, load balancing, or the like. In this case, as shown in FIG. 3, an IdleModeMobilityControlInfo (IMMCI) field 312 for delivering connection priorities of cells when the UE reselects a cell and a redirectedCarrierInfo field 311 for connecting the user with a specific cell may be included in the RRC connection release message.

The FBS redirection attack method and system according to an embodiment of the inventive concept may include a frequency and an evolved absolute radio frequency channel number (EARFCN) of an FBS in the dleModeMobilityControlInfo (IMMCI) field 312 and the redirectedCarrierInfo field 311 to generate a unicast message.

To force the target device to connect with the FBS, the FBS redirection attack method and system according to an embodiment of the inventive concept may set the frequency of the FBS to a high priority in the IMMCI field 312 when generating an attack message and may include the EARFCN of the FBS in the redirectedCarrrierInfo field 311. Particularly, when operating the FBS at a frequency which is not commercially used, because the target device is unable to be connected with the FBS, there may be a need to add the IMMCI field 312.

FIG. 4 illustrates a log result of a target device which is attacked to be connected with an FBS according to an embodiment of the inventive concept.

An FBS may operate in USRP B210 based on srsLTE using the setup used for attack verification, and a target device loaded with the commercial USIM may be used. The signal injection attack setup of the attacker may operate using USRP X310.

When the attacker using the FBS redirection attack according to an embodiment of the inventive concept injects an attack message including an information field of the FBS into a target device connected with a commercial base station, the target device may immediately end a connection with the commercial base station and may know that it is connected with the FBS of the attacker. Referring to FIG. 4, after the target device connected with a normal base station where the EARFCN is 100 receives an attack message, it may identify that it is connected with an FBS where the EARFCN is 363 (refer to 410).

FIG. 5 is a block diagram illustrating a detailed configuration of an FBS redirection attack system according to an embodiment of the inventive concept.

The FBS redirection attack system of FIG. 5 according to an embodiment of the inventive concept may inject an LTE control plane message into a target device connected with a commercial base station and may force the target device to connect with an FBS.

To this end, an FBS redirection attack system 500 according to an embodiment of the inventive concept may include a signal processing unit 510, a message transmission unit 520, and a connection attack unit 530.

The signal processing unit 510 may read a signal of a commercial base station connected with a target device which is an attack target to synchronize with the signal of the commercial base station.

In a state where the target device which is the attack target and the commercial base station which is a normal base station are connected with each other and where a normal service is performed after a security activation exchange process, the signal processing unit 510 may synchronize with a time and a frequency of the commercial base station connected with the target device. At this time, the target device may be in a state where a plain text message is not processed.

The target device according to an embodiment of the inventive concept refers to all types of terminal devices, such as a general computer, a smartphone, and a wearable device, which are capable of performing wired or wireless communication and processing certain data.

The message transmission unit 520 may transmit an international mobile subscriber identity (IMSI) paging message to the target device using an IMSI of the target deice.

The message transmission unit 520 according to an embodiment of the inventive concept may transmit the IMSI paging message to the target device using the IMSI of the target device. Receiving the IMSI paging message, the target device may immediately end the connection with an existing commercial base station, may delete all parameters including a security context, and may retry a process of accessing an old or new base station. Thus, the FBS relocation attack system 500 according to an embodiment of the inventive concept may delete a security context of a victim UE using the method for injecting the IMSI paging message into the target device.

Before the base station re-access process is completed in the target device which decodes the IMSI paging message, the connection attack unit 530 may inject a unicast message including a frequency of an FBS into the target device.

Before the target device which decodes the IMSI paging message completes the process of re-accessing an old or new base station, the connection attack unit 530 may inject an attack message including the frequency of the FBS into the target device.

In detail, the connection attack unit 530 may inject a unicast message of a radio resource control (RRC) connection release message into a UE-specific search space of the target device, before the target device completes the base station re-access process. In this case, the connection attack unit 530 may specify a UE-specific search space depending on a radio network temporary identifier (RNTI) of the target device and may inject a unicast message in which a downlink control information (DCI) format and a control plane sequence number according to a transmission mode of the network are set.

Thus, the target device, the security context of which is deleted, may process the RRC connection release message of plain text and may request access from the FBS to be connected with the FBS.

In this case, the RRC connection release message may include an IdleModeMobilityControlInfo (IMMCI) field for delivering connection priorities of cells when the target device reselects a cell and a redirectedCarrierInfo field for connecting a user with a specific cell and may include a frequency and an evolved absolute radio frequency channel number (EARFCN) of the FBS in each field.

An embodiment of the inventive concept may include a frequency of an LTE FBS, but may inject a unicast message including a frequency of a 3G or 2G FBS other than the frequency of the LTE FBS. In other words, although the FBS is run as the 3G or 2G base station as well as the 4G base station, the same attack is possible.

It is apparent to those skilled in the art that, although the description is omitted in the system of FIG. 5, the system according to an embodiment of the inventive concept may include all details described in FIGS. 1 to 4.

The foregoing systems or devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPGA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller.

Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The computer-readable media may also include, alone or in combination with the program instructions, data files, data structures, and the like. The program instructions recorded in the media may be designed and configured specially for the exemplary embodiments of the inventive concept or be known and available to those skilled in computer software. Examples of computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

According to an embodiment of the inventive concept, energy may be more efficient than an existing method for driving an FBS at a high signal intensity, an attack target may be specified, and a probability of being detected may be low. All surrounding UEs may be influenced in the existing method for driving the FBS at the high signal intensity. However, when using the FBS redirection attack proposed by an embodiment of the inventive concept, the FBS may not be driven at a high signal intensity and only a specific user may be connected with the FBS. Furthermore, because an attack is performed using only one message and because the message is injected by synchronizing with a signal of the commercial base station, a probability that the attack will be detected may be low.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A fake base station (FBS) redirection attack method using unicast message injection in a long term evolution (LTE) wireless section, the FBS redirection attack method comprising:
   synchronizing a fake base station (FBS) with a signal of a commercial base station connected with a target device being an attack target;
   transmitting an international mobile subscriber identity (IMSI) paging message from the FBS to the target device using an IMSI of the target device; and
   injecting a unicast message from the FBS including a frequency of the FBS into the target device, before a base station re-access process is completed in the target device which decodes the IMSI paging message,
   wherein the synchronizing includes synchronizing with the signal of the commercial base station, in a state where security activation between the target device and the commercial base station is completed,
   wherein the injecting of the unicast message includes injecting the unicast message of a radio resource control (RRC) connection release message, before the target device completes a process of re-accessing a base station, and wherein the target device processes the RRC connection release message of plain text, deletes the security context, and requests access from the FBS,
   wherein the RRC connection release message includes an IdleModeMobilityControlInfo (IMMCI) field for delivering connection priorities of cells when the target device reselects a cell and a redirectedCarrierInfo field for connecting a user with a specific cell and includes a frequency and an evolved absolute radio frequency channel number (EARFCN) of the FBS in the field.

2. The FBS redirection attack method of claim 1, wherein the transmitting of the IMSI paging message includes:
   transmitting the IMSI paging message to the target device, and
   wherein the target device ends a connection with the commercial base station by the IMSI paging message, deletes a security context, and retries a process of re-accessing a base station.

3. The FBS redirection attack method of claim 1, wherein the injecting of the unicast message includes:
   injecting the unicast message into a user equipment (UE)-specific search space of the target device.

4. The FBS redirection attack method of claim 3, wherein the injecting of the unicast message includes:
   specifying the UE-specific search space depending on a radio network temporary identifier (RNTI) of the target device and injecting the unicast message in which a downlink control information (DCI) format and a control plane sequence number according to a transmission mode of a network are set.

5. The FBS redirection attack method of claim 1, wherein the injecting of the unicast message includes:
   injecting the unicast message including the frequency of the FBS, the frequency being one of a frequency of an LTE FBS or a frequency of a 3 generation (G) or 2G FBS.

6. A fake base station (FBS) redirection attack method using unicast message injection in a long term evolution (LTE) wireless section, the FBS redirection attack method comprising:

synchronizing a fake base station (FBS) with a signal of a commercial base station, in a state where a target device being an attack target and the commercial base station are connected with each other;

collecting an international mobile subscriber identity (IMSI) and a radio network temporary identifier (RNTI) of the target device using the FBS;

transmitting an IMSI paging message from the FBS to the target device using the IMSI;

encoding a unicast message via the FBS in which a downlink control information (DCI) format and a control plane sequence number according to a transmission mode of a network are set;

specifying a UE-specific search space of the target device using the RNTI via the FBS; and injecting the unicast message from the FBS including a frequency of an FBS into the UE-specific search space, before a base station re-access process is completed in the target device which decodes the IMSI paging message.

* * * * *